US012596808B1

(12) United States Patent
Lakshminarayana et al.

(10) Patent No.: US 12,596,808 B1
(45) Date of Patent: Apr. 7, 2026

(54) SYSTEM AND METHOD TO DETECT BOOT KIT ATTACKS

(71) Applicant: Bank of America Corporation, Charlotte, NC (US)

(72) Inventors: Nagasubramanya Lakshminarayana, Concord, NC (US); Vijay Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 47 days.

(21) Appl. No.: 18/886,124

(22) Filed: Sep. 16, 2024

(51) Int. Cl.
G06F 21/57 (2013.01)
G06F 21/53 (2013.01)
G06F 21/60 (2013.01)

(52) U.S. Cl.
CPC ............ G06F 21/575 (2013.01); G06F 21/53 (2013.01); G06F 21/602 (2013.01)

(58) Field of Classification Search
CPC .......... G06F 21/57; G06F 21/53; G06F 21/60; G06F 21/575; G06F 21/602
See application file for complete search history.

(56) References Cited

U.S. PATENT DOCUMENTS

| | | | |
|---|---|---|---|
| 8,365,297 B1 | 1/2013 | Parshin et al. | |
| 9,230,112 B1 * | 1/2016 | Peterson ................. | G06F 21/76 |
| 9,251,343 B1 * | 2/2016 | Vincent ................. | G06F 21/575 |
| 11,537,716 B1 * | 12/2022 | Choudhary ............. | H04L 63/14 |
| 2015/0212747 A1 | 7/2015 | Hutchison et al. | |

| | | | |
|---|---|---|---|
| 2016/0357963 A1 | 12/2016 | Sherman | |
| 2016/0359636 A1 | 12/2016 | Kreft | |
| 2017/0213030 A1 | 7/2017 | Mooring et al. | |
| 2017/0357808 A1 | 12/2017 | Arroyo | |
| 2018/0004953 A1 | 1/2018 | Smith, II et al. | |
| 2019/0163909 A1 | 5/2019 | Schilder et al. | |
| 2019/0363894 A1 | 11/2019 | Kumar Ujjwal | |
| 2020/0174949 A1 | 6/2020 | Ramasamy et al. | |
| 2020/0302061 A1 * | 9/2020 | Rizos .................... | G06F 3/0683 |

(Continued)

FOREIGN PATENT DOCUMENTS

| | | | | | |
|---|---|---|---|---|---|
| EP | | 3259698 B1 * | 12/2020 | ........... | G06F 21/575 |

OTHER PUBLICATIONS

"There's a Hole in the Boot;" by: Eclypsium; dtd Jul. 29, 2020; https://eclypsium.com/blog/theres-a-hole-in-the-boot/.

(Continued)

*Primary Examiner* — Jayesh M Jhaveri
(74) *Attorney, Agent, or Firm* — Baker Botts L.L.P.

(57) ABSTRACT

A system and method for detecting boot kit attacks that includes a memory configured to store previous hash values associated with a good boot sequence and a processor operably coupled to the memory. The processor is configured to receive from an external device current boot data associated with a current boot procedure of the external device. The current boot data includes at least an amount of network data sent and received by the external device. Once the processor receives the current boot data, the processor then performs a hash function on the current boot data to produce a current hash value. The processor then compares the current hash value with the previous hash value stored in the memory and sends to the external device a notification to use a previous boot procedure when the current hash value is different than the previous hash value.

20 Claims, 4 Drawing Sheets

(56)            References Cited

U.S. PATENT DOCUMENTS

2020/0342112 A1    10/2020  Plusquellic
2021/0312052 A1    10/2021  Kloth
2022/0100849 A1     3/2022  Vandergeest

OTHER PUBLICATIONS

"What is Bootkit;" ReasonLabs; https://cyberpedia.reasonlabs.com/
EN/bootkit.html; copyright 2023; printed Sep. 10, 2024.
"What is Bootkit;" ReasonLabs; https://cyberpedia.reasonlabs.com/
EN/bootkit.html#:~:text=Bootkits%20are%20especially%
20dangerous%20because,challenging%20to%20locate%20and%
20eradicate; copyright 2023; printed Sep. 10, 2024.

* cited by examiner

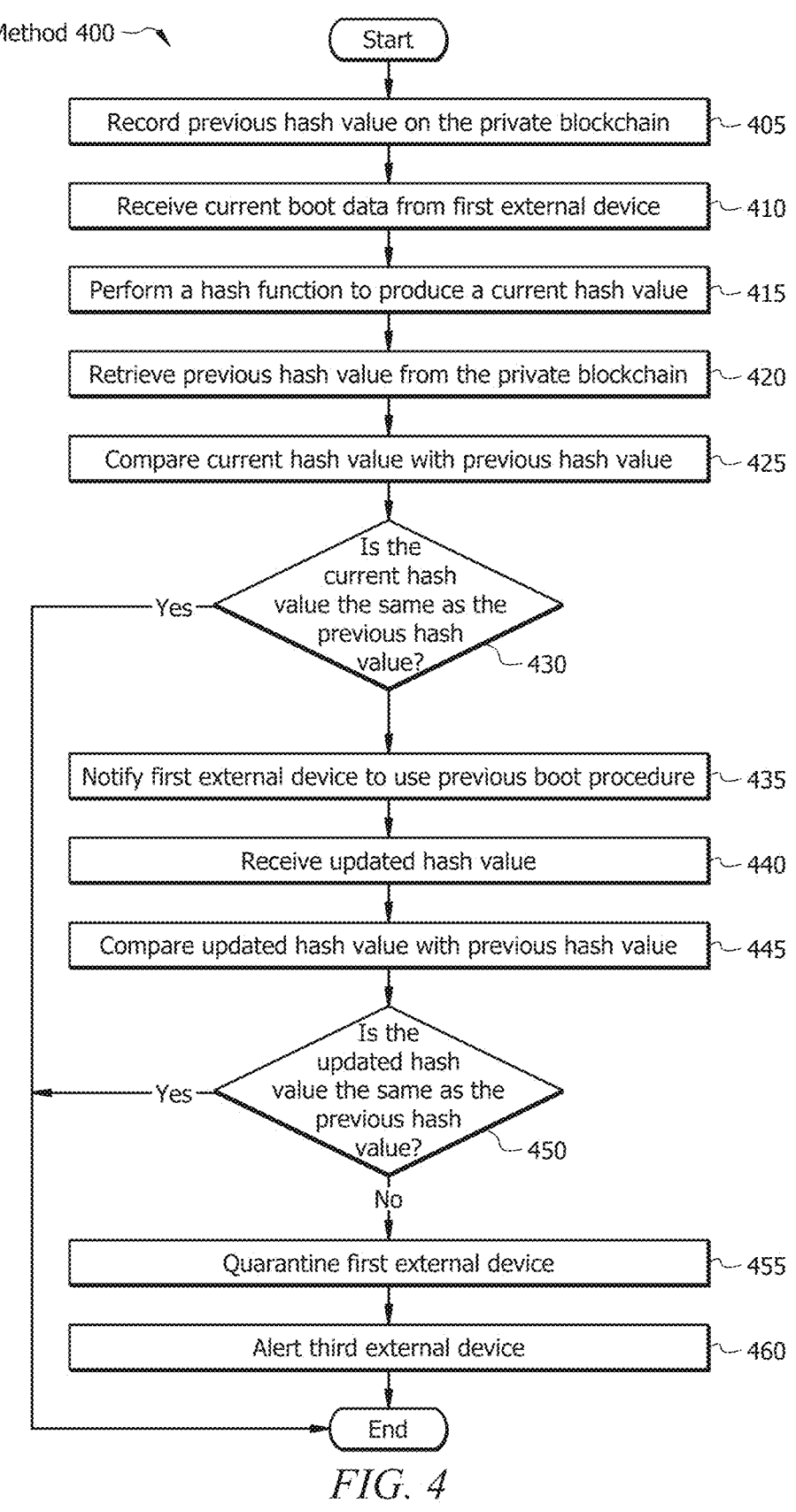

Method 400

Start

Record previous hash value on the private blockchain — 405

Receive current boot data from first external device — 410

Perform a hash function to produce a current hash value — 415

Retrieve previous hash value from the private blockchain — 420

Compare current hash value with previous hash value — 425

Is the current hash value the same as the previous hash value? — 430

Yes

Notify first external device to use previous boot procedure — 435

Receive updated hash value — 440

Compare updated hash value with previous hash value — 445

Is the updated hash value the same as the previous hash value? — 450

Yes

No

Quarantine first external device — 455

Alert third external device — 460

End

*FIG. 4*

SYSTEM AND METHOD TO DETECT BOOT KIT ATTACKS

TECHNICAL FIELD

The present disclosure generally relates to networked computing and, more specifically, to a system and method to detect boot kit attacks.

BACKGROUND

Computational devices are used for various purposes and may take many forms. They not only take the form of mobile devices and computers, but they also are found in everyday things such as, but not limited to, appliances, televisions, and smart home technologies. As computational devices become more prevalent and part of everyday life, people are more exposed to risks associated with computational devices. Bad actors constantly search for ways to compromise, disable, and/or use computational devices for nefarious purposes.

SUMMARY

The system and method disclosed in the present application provide a technical solution to the technical problems discussed above by providing a method to detect boot kit attacks directed at a computational device. Boot kit attacks are difficult to detect and, if successful, hard to remove from an infected computational device. Boot kit attacks take the form of malware that targets the boot sequence before the initialization and loading of the operating system of a computational device. This generally makes the malware invisible or at least unpreventable by anti-virus applications that rely on the operating systems to function.

The system and method disclosed in the present application detect boot kit attacks by monitoring the boot process and sequence of the computational device. The system and method perform a hash on data related to the boot process and sequence of the computational device and compare this to a previously stored hash value. When these values are different, preventive actions are taken to prevent further problems related to a potential boot kit attack, such as quarantining the computational device and/or alerting the appropriate security personnel. By performing embodiments, boot kit attacks may be quickly, and efficiently detected, and further infection or destruction of connected devices may be prevented.

In one or more embodiments, the disclosed system includes a memory configured to store a previous hash value for a first external device. The previous hash value was produced using data associated with a previous boot procedure of the first external device that had been identified as not being corrupted. This previous hash value in one or more embodiments may be stored on a private blockchain.

Once the previous hash value is stored in the memory, a processor operably coupled to the memory receives the current boot data associated with a current boot procedure from the first external device. A hash function is then performed by the processor on the current boot data, and the resulting hash values are compared with the previous hash value. The processor then sends instructions to the first external device to use a previous boot procedure when the hash value is different than the previous hash value.

The current boot data in one or more embodiments may include the amount of network data sent and received by the first external device while performing a boot sequence. The current boot data may also include the amount of time it takes to perform the entire boot sequence and/or the amount of time it takes to perform each step in the boot sequence. Other things, such as the physical characteristics of one or more components of the computational device, may also be included in the current boot data. The current boot data may consist of any information that is useful in performing a hash function and determining if the boot procedure is no longer safe or uncorrupted.

The disclosed system provides several practical applications, such as improved detection of attacks against the boot sequence of a computational device. The improved detection does not require extensive modification of the boot sequence and/or the computational device. Utilizing a blockchain to maintain the previous hash values may ensure that a bad actor is not easily able to avoid detection. Further, by using a hash value instead of other means, the one or more embodiments the details of the boot sequence do not have to be exposed to the system providing the monitoring in accordance with one or more embodiments. This results in computational devices such as mobile computing devices, network systems, Internet of Things (IoT) devices, and backend/servers being more reliable and better protected from bad actors without any loss in performance.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates one embodiment of a flowchart for detecting and preventing boot kit attacks.

DETAILED DESCRIPTION

System, Overview

Figure 1:
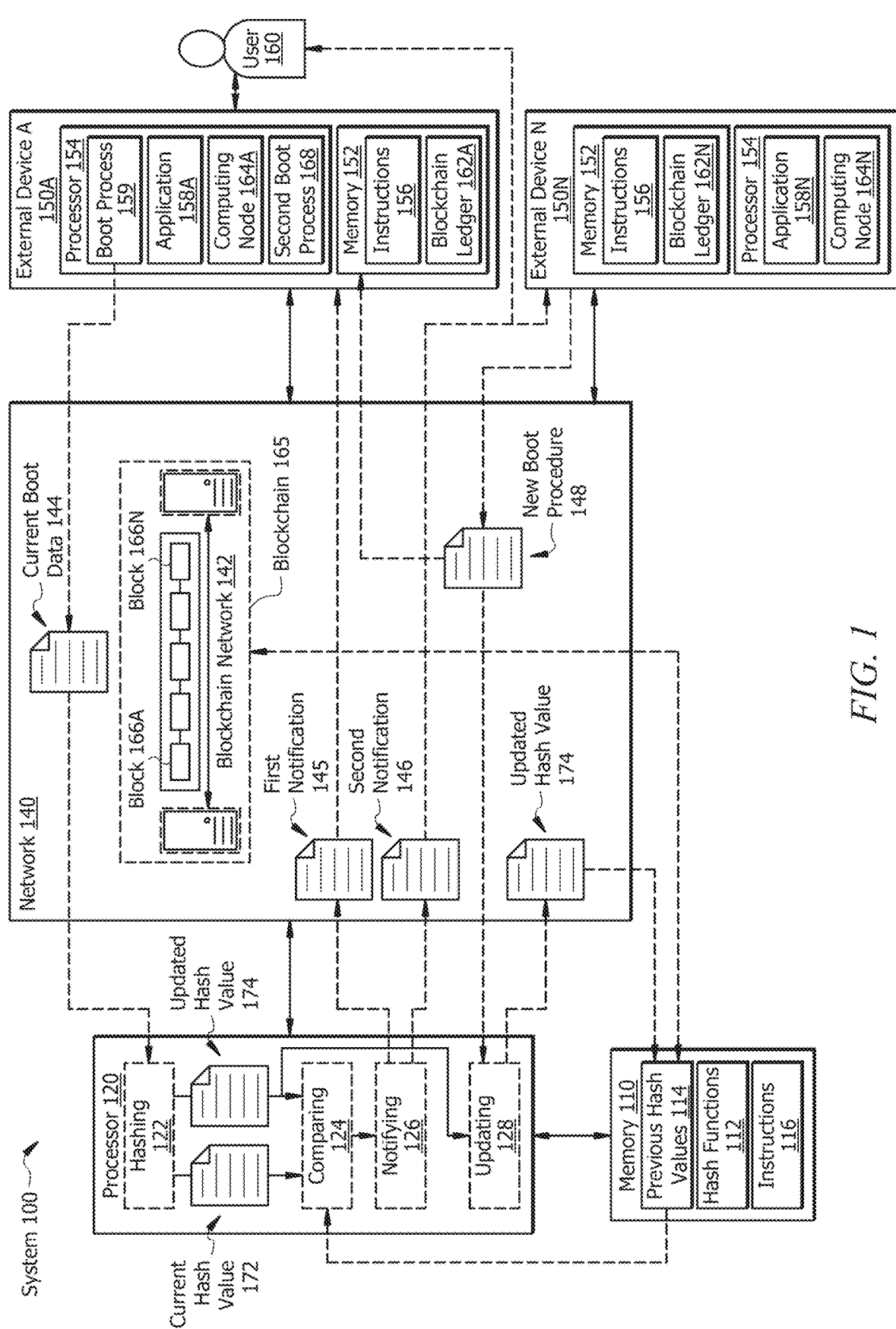
FIG. 1 illustrates one embodiment of a system for detecting and preventing boot kit attacks.

FIG. 1 is a schematic diagram of a system 100 configured for detecting and preventing boot kit attacks against one or more external devices 150A-150N. In one embodiment, system 100 comprises one or more external devices 150A-150N, a network 140, a processor 120, and a memory 110. The processor 120 and memory 110 are in signal communication through the network 140 with the external device 150A-150N. The system 100 may be configured as shown or in any other suitable configuration.

In general, system 100 is configured to receive current boot data 144 from an external device, e.g., 150A. The processor 120 then performs hashing 122 on the current boot data 144 to determine a current hash value 172, which the processor 120 then compares 124 with a previous hash value 114 in order to determine if the current boot data 144 is representative of a boot kit attack against the external device, e.g., 150A. If a potential boot kit attack is detected, appropriate actions are taken by the processor 120 to either quarantine the external device, e.g., 150A, or to repair the boot process 159 of the external device, e.g., 150A.

External Devices

The external devices 150A-150N may include any number of devices that perform one or more applications 158A-158N. Examples of an external device, e.g., 150A, may include but are not limited to, computers, laptops, mobile devices (e.g., smartphones or tablets), servers, clients, automated teller machines (ATM), point of sale devices (POS), or any other suitable type of devices that may be used for accessing or supporting an application 158A-158N. The external device, e.g., 150A, may be associated with a user 160, or the external device, e.g., 150N, may be associated with a manufacturer or other devices similar to an external device, e.g., 150A, that may potentially provide a new boot procedure 148. While only two external devices 150A and 150N are shown, in one or more embodiments, a plurality of external devices 150A-150N, may be present, each hosting one or more applications 158A-158N that allow the external device, e.g., 150A to interact with a user 160, the processor 120, or other external devices, e.g., 150N.

The external devices 150A-150N include at least one processor 154 that performs one or more processes or operations, including performing applications 158A-158N and/or other actions and activities such as, but not limited to, performing a boot process 159, sending current boot data 144, new boot procedures 148 to the processor 120 over the network 140 and receiving a first notification 145 and a second notification 146. The processor 154 executes instructions 156 stored in the memory 152 to perform the applications 158A-158N, boot processes 159, and/or other actions. The applications 158A-158N may include web pages, database applications, banking applications, word processing applications, entertainment applications, video applications, and/or any other applications that an organization may have hosted by an external device, e.g., 150A. The applications 158A-158N may perform one or more actions that interact with a user 160, for example, allowing the user 160 to enter data, check account balances, and perform other interactions with an external device, e.g., 150A and/or one or more applications 158A-158N.

When executing the applications 158A-158N, the processor 154 may perform various operations. The processor 154, for example, may make application programming interface (API) calls, perform batch jobs, modify application data, and modify application data stored in other external devices, e.g., 150N. The processor 154 may also perform one or more mathematical and logical operations, start and/or maintain active threads, and send and/or receive data or other information through and from the network 140. The processor 154 may perform activities associated with one or more blockchain nodes 164A-164N. The processor 154 may perform other operations not listed above without departing from the disclosure; those listed are provided only as examples.

The processor 154 in one or more embodiments, may perform a boot process 159. The boot process 159 may be run when the external device, e.g., 150A, is initially powered on or at any other appropriate time. In one or more embodiments, the boot process 159 comprises loading a basic input/output system (BIOS) or unified extensible firmware interface (UEFI). The BIOS or UEFI is firmware that is used to perform hardware initialization during the booting process. It may perform such actions as testing hardware components, checking settings and configurations of the external device, e.g., 150A, and performing an operating system (OS) boot loader function or loading an OS kernel. The boot process 159 may comprise a sequence of activities that are either performed sequentially or in parallel.

In one or more embodiments, the boot process 159 may be stored as instructions 156 in memory 152. Alternatively, it may be stored separately in a BIOS/UEFI-specific storage. The boot process 159 may be upgradable, as will be described in more detail below with regards to FIGS. 2-4, by receiving a new boot procedure 148 from another external device, e.g., 150N, the processor 120, or any other source. In one or more embodiments, the external device, e.g., 150A, has more than one version of the boot process 159 stored and at least initially uses the newest boot procedure 148 received.

The external devices 150A-150N may include a memory 152 for storing instructions 156 for performing the applications 158A-158N, boot process 159, and/or any other actions or processes that the external device, e.g., 150A, performs. In one or more embodiments, the memory 152 may also store new boot procedures 148, previous or current boot data 144, blockchain ledgers 162A-162N storing one or more blocks 166A-166N, and any other information needed for performing the applications 158A-158N and boot process 159.

The memory 152 may be any type of storage for storing instructions 156 for executing by the processor 154 as well as any other data. The memory 152 may be a non-transitory computer-readable medium in operative communication with the processor 154. The memory 152 may be one or more disks, tape drives, or solid-state drives. Alternatively, or in addition, the memory 152 may be one or more cloud storage devices. The memory 152 may be volatile or non-volatile. It may comprise read-only memory (ROM), random-access memory (RAM), ternary content-addressable memory (TCAM), dynamic random-access memory (DRAM), and static random-access memory (SRAM).

While FIG. 1 shows the user devices 150A-150N, each including only a single processor 154 and a memory 152, they may include any suitable number and combination of processors, e.g., 154 and memories 152, as well as any other necessary components. For simplicity, only one processor, e.g., 154, and one memory, e.g., 152, are shown in FIG. 1.

Network

The network 140 may be any suitable type of wireless and/or wired network including, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network. The network 140 may be configured to support any suitable type of communication protocol as would be appreciated by one of ordinary skill in the art.

The network 140 may connect the external devices 150A-150N with the processor 120 and memory 110. The network 140 may also connect the external devices 150A-150N to themselves and/or other external devices 150A-150N through the Internet or other large networks. In one or more embodiments, different elements of system 100 may be at different geographic locations and connected through the network 140. While shown as a single network 140, the network 140 may comprise a plurality of components of any suitable networking equipment, including but not limited to routers and switches, that allow at least the external devices 150A-150N to communicate with the processor 120, memory 110, other user devices, e.g., 130 or external devices 150A-150N. The network 140 may facilitate the transmission of the current boot data 144, first notification 145, second notification 146, new boot procedure 148, updated hash values 174 and previous hash values 114, between the processor 120, memory 110, and one or more of the external devices 150A-150N. Network 140 is not limited to the configuration shown in FIG. 1, which is simply shown in this form for simplicity and explanatory purposes.

In one or more embodiments, the network 140 and/or the external devices 150A-150N may host or facilitate access to a blockchain network 142. The blockchain network 142 may support one or more blockchains, including a private blockchain. The blockchain network 142 comprises a plurality of blockchain computing nodes 164A-164N, which may be hosted on one or more external devices 150A-150N and communicate over a traditional network 140 such as, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network.

Additionally, blockchain information in the form of blockchain ledgers 162A-162N may be stored in the memory 152 of one or more external devices 150A-150N. The blockchain information is not limited to being stored as ledgers, e.g., 162A-162N, and may take any form without departing from the disclosure. A blockchain network, e.g., 142, generally is an open, decentralized, and distributed digital ledger consisting of records called blocks, e.g., 166A-166N, that are used to record data interactions across many computing nodes, e.g., 164A-164N. Each computing node, e.g., 164A of a blockchain network 142, may maintain a copy of the blockchain ledger, e.g., 162A.

Logically, a blockchain, e.g., 165, is a chain of blocks, e.g., 166A-166N, that contains specific information. Once recorded, the data in any given block, e.g., 166A, cannot be altered retroactively without the alteration of all subsequent blocks 166B-166N, which requires the consensus of the blockchain network 142 majority. Each computing node, e.g., 164A-164N within the blockchain network 142, maintains, approves, and updates new entries. The blockchain network 142 is controlled not only by separate nodes 164A-164N but by everyone within the blockchain network 142. Each node, e.g., 164A, ensures that all records and procedures are in order, which results in data validity and security. Thus, the distributed ledgers 162A-162N can record interactions between two parties, e.g., 150A and 120, efficiently and in a verifiable and permanent way.

By design, a blockchain, e.g., 165, is resistant to data modification. For use as a distributed ledger, a blockchain, e.g., 165, is typically managed by a peer-to-peer network collectively adhering to a protocol for inter-node communication and validating new blocks 166A-166N. In the context of the present disclosure, each blockchain computing node 164A-164N of the first set of computing nodes 164A-164N may store a copy of a blockchain ledger, e.g., 162A of the blockchain 165, wherein each copy of the blockchain ledger, e.g., 162A includes a copy of the blockchain 165 stored in the blockchain network 142. A blockchain network 142 uses public-key cryptography to transfer data between computing nodes 164A-164N securely. Public-key cryptography uses a combination of a public key and a private key to secure data in a blockchain network so that only the rightful owner of the data can access the data. A public key is like an address on the blockchain 165 to which data may be sent and recorded as belonging to that address.

A private key is like a password that gives users access to digital possessions recorded against a public key.

Each computing node, e.g., 164A of a blockchain network, e.g., 142, is configured to process new blocks 166A-166N generated for the blockchain network, e.g., 142, and maintain a most recent copy of the blockchain 165 in the respective ledgers 162A-162N. Any new interaction or activity within the blockchain network, e.g., 142, may trigger building a new block, e.g., 166A of the blockchain 165. An interaction may include a node, e.g., 164N of the blockchain network 142, receiving an updated hash value 174 from the processor 120. Before a new block, e.g., 166A, is added to the blockchain network 142, it needs to be verified by a majority of the nodes 164A-164N in the blockchain network 142. Once approved by a majority of the computing nodes 164A-164N, the new block 166A, which, for example, may be the updated hash value 174, is added to the blockchain 165 hosted by the blockchain network 142. Once a new block, e.g., 166A, is approved for addition to the blockchain 165 hosted by the blockchain network 142, each of the nodes 1164A-164N of the blockchain network 142 may be configured to update the blockchain ledger 162A-162N associated with each of the nodes 164A-164N to reflect the addition of the new block, e.g., 166A.

Memory

Memory 110 may be any type of storage for storing a computer program comprising instructions 116, hash functions 112, and previous hash values 114. The memory 110 may be a non-transitory computer-readable medium in operative communication with the processor 120. The memory 110 may be one or more disks, tape drives, or solid-state drives. Alternatively, or in addition, the memory 110 may be one or more cloud storage devices. The memory 110 may be volatile or non-volatile. It may comprise read-only memory (ROM), random-access memory (RAM), ternary content-addressable memory (TCAM), dynamic random-access memory (DRAM), and static random-access memory (SRAM).

The memory 110 stores instructions 116, which, when executed by the processor 120, causes the processor 120 to perform the operations shown in FIGS. 2-4 and described below. Instructions 116 may comprise any suitable set of instructions, logic, rules, or code. Memory 110 may include storage that may take the form of a database for storing things such as previous hash values 114. These may be stored and recalled using known protocols such as SQL, XML, and/or any other protocol or language that a user, administrator, or developer of the system 100 wishes to use. The instructions 116, previous hash values 114, hash functions 112, and any other information stored in memory 110 may be stored in different forms. The disclosure includes storing the instructions 116, previous hash values 114, and hash functions 112 as a database.

The memory 110 in one or more embodiments stores hash functions 112. Hash functions are any functions or algorithms that may be used to map data of arbitrary sizes to fixed-size values. Hash values allow for storing information on a record, for example, current boot data 144, in a smaller amount of storage space than the actual record, e.g., boot data 144, would take. Further, they are computationally efficient and allow for quick creation and efficient comparisons between different hash values, e.g., current hash value 172 and previous hash value 114. The hash function 112 may take any form, including SHA-256, or any other form, including non-cryptographic hash functions and cryptographic hash functions.

The memory 110 may also store previous hash values 114, which are generated from updated hash values 174. The updated hash values 174 are produced by the processor 120, as will be described in more detail below, each time a new boot procedure 148 is received by the processor 120 from an external device, e.g., 150N.

Processor

The processor 120 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 110. One or more processors make up the processor 120 and are configured to process data, which may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions 116 from memory 110 and executes them by directing the coordinated operations of the ALU, registers and other components.

The processor 120 is in operative communication with memory 110 and configured to implement various instructions 116 stored in memory 110. The processor 120 may be a special-purpose computer designed to implement the instructions 116 and/or functions disclosed herein. For example, the processor 120 may be configured to perform operations, including those described below and shown in FIGS. 2-4.

The processor 120, in one or more embodiments, when an external device, e.g., 150A, performs a boot process 159 may receive current boot data 144 from the external device, e.g., 150A, through the network 140. When the processor 120 receives the current boot data 144, the processor 120 performs hashing 122 to produce a current hash value 172. When the processor 120 performs hashing 122, it may apply one or more hash functions 112 stored in the memory 110 to the entire current boot data 144 or various aspects of it.

For example, in a non-limiting example, the processor 120 may perform a hash function on non-physical characteristics of the boot process 159 and/or the processor 154 performing the boot process 159 in an external device, e.g., 150A, such as, but not limited to: the time values related to each step of the boot process 159, the size in bytes of the instructions 156 used during the boot process 159, and/or the amount of communications between the network 140 and the external device, e.g., 150A during the boot process 159. In another example, a hash function 112 may be applied to data in the current boot data 144 related to the physical characteristics of the external device, e.g., 150A, such as, but not limited to, the heat produced by the processor 154 during the boot process 159, the amount of power needed at various stages of the boot process 159, and/or other characteristics. The processor 120, when performing hashing 122, may use one or more hash functions 112 to produce a current hash value 172 with other values and characteristics stored in the current boot data 144; the above are examples only, and the disclosure is not limited to them.

Once the processor 120 performing hashing 122 determines a current hash value 172, it then performs comparing 124. When performing comparing 124, the processor 120 compares the current hash values 172 to the previous hash values 114. If the current hash value 172 is different from the previous hash value 114, the processor 120 may determine that a book kit attack is currently in progress.

The previous hash values 114 may be stored in the memory 110 and/or on an optional blockchain network 142. The previous hash values 114 are hash values that were produced from one or more previous boot procedure that was identified as not being corrupted. The previous hash values 114 may be created the first time the external device, e.g., 150A, performs a boot process 159, or they may be provided by another external device, e.g., 150N associated with a manufacturer of the boot process 159 and/or the entire external device, e.g., 150A. In addition, or alternatively, the previous hash value 114 may be the result of an updated hash value 174, created as a result of a new boot procedure 148 received from an external device, e.g., 150N, or another source such as, but not limited to a manufacturer, developer, administrator, backup, or any other source.

Once the processor 120 finishes comparing 124 the current hash value 172 to the previous hash value 114, the processor performs notifying 126. When performing notifying 126, the processor may send a first notification 145 to the first external device, e.g., 150A. In one or more embodiments, the notification 145 may be an instruction to use a previous or second boot process 168, which may be stored in memory 152 or may be a new boot procedure 148 obtained from another external device, e.g., 150N. The first notification 145, additionally, or alternatively, in one or more embodiments, may include an alert to a user 160 and/or one or more applications, e.g., 158A associated with cybersecurity and/or boot kit attack prevention.

Once the processor 120 sends the first notification 145, the external device, e.g., 150A, may perform a second boot process 168. As a result, the external device, e.g., 150A, then sends the current boot data 144 for the second boot process 168 to the processor 120, which then performs hashing 122 to produce an updated hash value 174. The processor 120 then performs comparing 124 on the new current hash value 172 to determine if the second boot process 168 has a current hash value 172 that matches the previous hash value 114, indicating that the second boot process 168 is not compromised. If, however, the processor 120 determines when comparing 124 that the current hash value 172 produced from the current boot data 144 of the second boot process 168 does not match the previous hash value 114, the processor 120 then, when performing notifying 126 sends a second notification 146 through the network 140 to both the first external device, e.g., 150A and at least one other external device, e.g., 150N.

The second notification 146 may comprise an instruction to the first external device, e.g., 150A, to place the first external device, e.g., 150A, under quarantine and/or use at least one quarantine action. The quarantine action may cause the external device, e.g., 150A, to disconnect from network 140 or perform any other action that will prevent damage from a boot kit attack or another cyberattack, from damaging other external devices, e.g., 150N and/or a processor 120. The second notification 146 may also go to a second external device, e.g., 150N, which may issue a new boot procedure 148. The updated hash value 174 may then be produced by the processor 120 performing updating 128. During updating 128, the updated hash value 174 may be replaced or added to the memory 110 as a previous hash value 114 and/or may be added to the blockchain 165.

Figure 2:
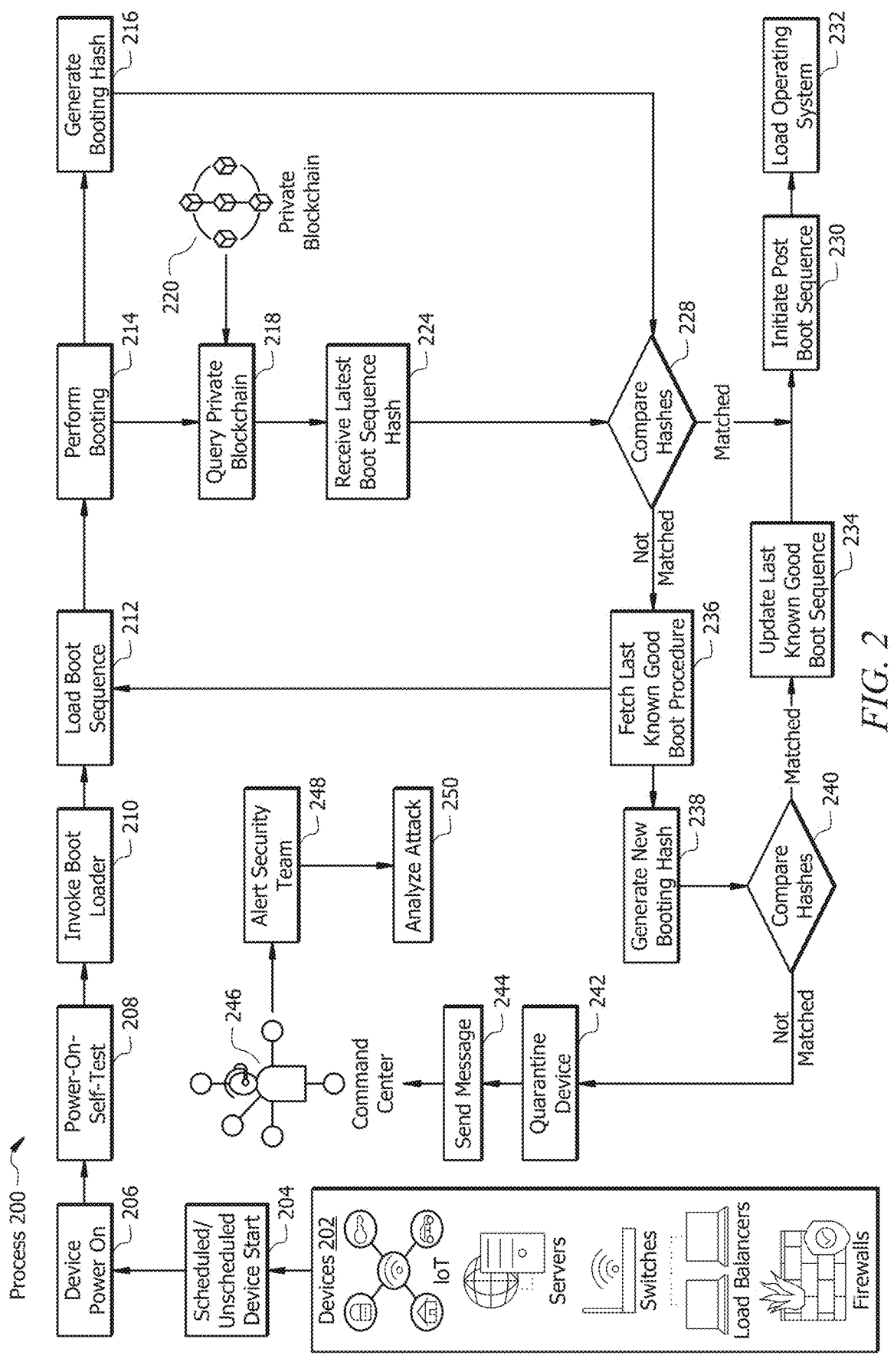
FIG. 2 illustrates one embodiment of an exemplary process for detecting and preventing boot kit attacks using a private blockchain.

Exemplary Process for Detecting and Preventing Boot Kit Attacks Using a Private Blockchain FIG. 2 is a non-limiting example of an exemplary process using a private blockchain to detect and prevent boot kit attacks. FIG. 2 is an example of a specific process and/or application; the disclosure is not limited to the process and/or application shown in FIG. 2. The example of FIG. 2 may be performed by system 100 described above and shown in FIG. 1 or may use any system or components able to perform the example.

The process of FIG. 2 begins when a device 202 performs a scheduled or unscheduled device start 204. The devices 202 may be an external device, e.g., 150A as previously described with regards to FIG. 1, or may be any other type of device such as, but not limited to, a firewall, a load balancer, a network switch, a storage device, a server, or any device in an Internet of things (IoT) or another computing environment. When the scheduled or unscheduled device start 204 occurs, the device 202 then powers on 206.

Once the device 202 powers on 206, it will perform a power-on self-test 208. Provided the device 202 passes the power-on self-test 208 and/or successfully turns on, a boot loader is invoked 210, and a boot sequence is loaded 212. This loaded boot sequence 212 may comprise a stored boot process, e.g., 159, or a previous boot procedure, e.g., second boot process 168. Once the device 202 loads the boot sequence 212, it then performs booting 214.

When performing booting 214, the device 202, in one or more embodiments, performs a series of steps, which may include such things as loading a basic input/output system (BIOS) or unified extensible firmware interface (UEFI). The BIOS or UEFI is firmware that is used to perform hardware initialization during the booting process. It may perform such actions as testing hardware components, checking settings and configurations of the external device, e.g., 150A, and performing an operating system (OS) boot loader function or loading an OS kernel. Performing booting 214 may comprise obtaining information from other external devices, e.g., 150N, or a processor 120 using the network, e.g., 140. Alternatively, or additionally, performing booting 214 may comprise performing and using instructions, e.g., 156 stored in the device 202. When performing booting 214, the device 202 may perform a sequence of activities that are either performed sequentially or in parallel.

In one or more embodiments, while performing booting 214, the device 202 collects and/or stores current boot data 144 about the boot process. This may be a complete telemetry of the device 202 as it performs booting 214, or it may be a recording of data related to only those aspects that have been determined previously to be useful in detecting a boot kit attack. Such aspects may be, in non-limiting examples, processor heat, processor power usage, the total time for performing booting, individual times for performing specific steps when performing booting 214, the size of the instructions, e.g., 156 for performing booting 214, the amount of data transmitted or received from a network, e.g., 140 while performing booting, or any other data that a user, e.g., 160, administrator, developer, manufacturer, or any other concerned party determines is necessary for detecting boot kit attacks.

Once the device 202 performs booting 214, the processor, e.g., 120, generates a booting hash 216. The processor, e.g., 120, uses hash functions, e.g., 112, stored in the memory 110 to generate a booting hash 216 on information stored in the current boot data 144. Hash functions, e.g., 112, are any functions or algorithms that may be used to map data of arbitrary sizes to fixed-size values. Hash values allow for storing information on a record, for example, current boot data, e.g., 144, in a smaller amount of storage space than the actual record, e.g., boot data 144, would take. Further, they are computationally efficient and allow for quick creation and efficient comparisons between different hash values, e.g., current hash value 172 and previous hash value 114. The hash function 112 may take any form, including SHA-256, or any other form, including non-cryptographic hash functions and cryptographic hash functions.

Once the processor, e.g., 120, generates a booting hash 216 and generates a current hash value, e.g., 172. The processor, e.g., 120, compares the current hash value, e.g., 172, with a previous hash value, e.g., 114. In one or more embodiments, while the device 202 performs booting 214 or after performing booting 214, the processor, e.g., 120, queries a private blockchain 218. The private blockchain 220 comprises a plurality of blockchain computing nodes 164A-164N which may be hosted on one or more external devices 150A-150N and communicate over a traditional network 140 such as, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network. The blockchain computing nodes 164A-164N comprise ledgers that store blocks that contain previous hash values 114 in a form that is not easily altered. As will be described in more detail with regards to FIG. 3, the blockchain is created and/or updated when receiving an updated hash value of 174.

Once the processor, e.g., 120, queries the private blockchain 218, it receives the latest boot sequence hash 224, which is used by the processor, e.g., 120, to compare the current hash value, e.g., 172, and the previous hash value, e.g., 114 obtained from the private blockchain 220. If the two hash values are the same or match, the device 202 initiates a post-boot sequence 230 and loads the operating system 232. If the two hash values do not match, then the external device, e.g., 150A, or the processor, e.g., 120, fetches the last known good boot procedure 236. This may take the form of a second boot process, e.g., 168, or other boot processes (not shown) stored by the first external device, e.g., 150A, or another external device, e.g., 150N.

The processor, e.g., 120, then generates a new booting hash in the same manner as it generated the original booting hash 216. The processor, e.g., 120, then compares the hashes 240 (e.g., previous hash value 114 and updated hash value 174). If these hashes match, the device 202 and/or the processor, e.g., 120, update the last known good boot sequence 234, initiate the post-boot sequence 230, and load the operating system 232.

However, if the processor, e.g., 120, determines when comparing the hashes 240 that the new booting hash does not match the previous hash value, e.g., 114, the processor, e.g., 120, sends a notification, e.g., 146, to quarantine the device 242 and sends a message 244 to a command center 246 to alert a security team 248 and/or analyze the attack 250. The command center 246 may comprise a second external device, e.g., 150N, a user 160, or an administrator or other concerned party, so an appropriate response to mitigate any damage may be made.

Figure 3:
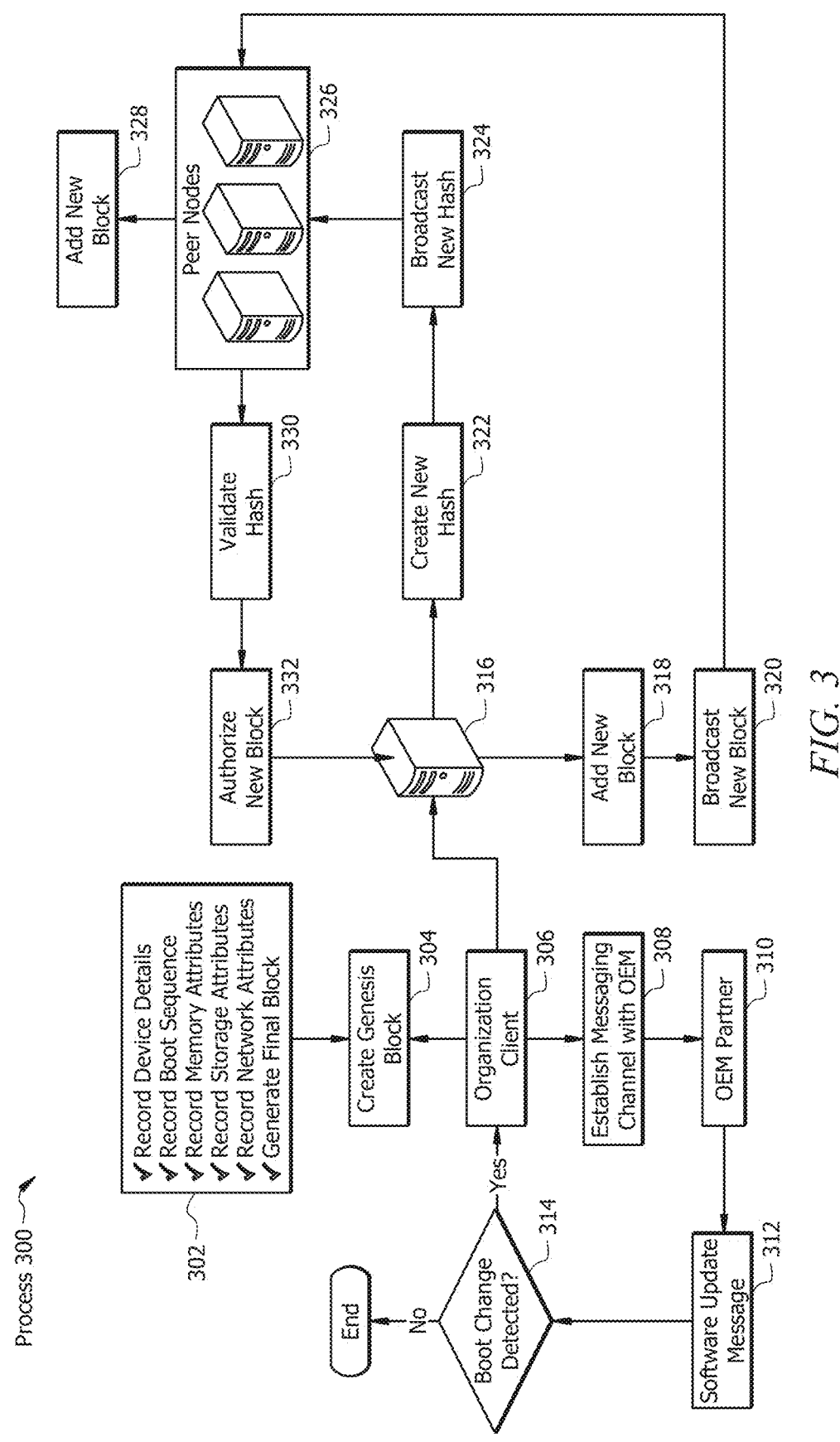
FIG. 3 illustrates one embodiment of an exemplary process for creating a private blockchain for preventing boot kit attacks.

Exemplary Process for Creating a Private Blockchain for Preventing Boot Kit Attacks FIG. 3 is a non-limiting example of an exemplary process for creating a private blockchain, e.g., 165 for storing previous hash values 114 used to detect and prevent boot kit attacks. FIG. 3 is an example of a specific process and/or application; the disclosure is not limited to the process and/or application shown in FIG. 3. The example of FIG. 3 may be performed by system 100 described above and shown in FIG. 1 or may use any system or components able to perform the example. Similarly, the example of FIG. 3 may be to make the private blockchain 220 of FIG. 2 or may be part of any other process or system that uses a private blockchain.

When a new blockchain, e.g., 165, is initiated, data 307, such as a previous hash value, e.g., 114, is used to create a genesis block 304, an organization client 306, such as a processor, e.g., 120, receives the genesis block 304. Alternatively, when the blockchain, e.g., 165, already exists, a messaging channel between the organization client 306 and original equipment manufacturer (OEM) 308 may be established. The OEM partner 310 then may send a software update message 312; the software update message 312 may be a routine update to an external device, e.g., 150A, or in one or more embodiments, may be the result of a previous detection of a boot kit attack or another form of cyberattack. If the organization client 306 determines that the software update message 312 includes a boot change 314, the process 300 continues. If no boot change 314 is detected, the process will end at 300. Otherwise, a new block 316 is created, and the new block is added 318 to the organization client 306 and broadcast 320 to the peer nodes 326.

At the same time or subsequently, a new hash is created 322 for the new block 316; this new hash is also broadcast 324 to the peer nodes. The peer nodes add the new block 328 and validate the hash 330. The hash 330 is validated based on the rules of the private blockchain 165 and the type of blockchain 165 being created. If the hash is validated 330 and the new block is authorized 332, the updated block is stored in the peer nodes 326 and blockchain 165 and process 300 of FIG. 3 ends.

Process for Detecting and Preventing Boot Kit Attacks

FIG. 4 is a flowchart of an embodiment of method 400 performed by a processor 120 for detecting and preventing boot kit attacks on the boot process 159 of an external device, e.g., 150A. The processor 120 may execute instructions 116 stored in the memory 110, which employs method 400 for determining if a boot process 159 on an external device, e.g., 150A, has been attacked using a boot kit attack.

Method 400 begins at operation 405 when processor 120 records a previous hash value 114 in the memory 110 and/or the private blockchain 165. This previous hash value 114, may be the result of an updated hash value 147 produced from a new boot procedure 148. This may be the initial new boot procedure 148 received from an external device, e.g., 150N, associated with the manufacturer, an administrator, or other concerned entity associated with the first external device, e.g., 150A.

Once the processor 120 records the previous hash value on the private blockchain 165 in operation 405, at some later time, the processor 120 then receives current boot data 144 from the first external device, e.g., 150A. The current boot data 144 may include information about the boot process 159, such as one or more physical properties of the processor 154 and/or the external device, e.g., 150A; it may also include data such as the amount of time each step of the boot process 159 takes, how much data is transferred over the network 140 during the boot process 159, the size of the instructions 156 for performing the boot process 159, and/or any other data that is deemed to be useful to determine if the boot process 159 is successful and/or is the subject of a boot kit attack.

Once the processor 120 receives the current boot data 144 in operation 410, the processor 120 performs a hash function 112 on the current boot data 144 in operation 415 to produce a current hash value 172. The current hash value 172 may be a combination of current hash values 172 for different pieces of information or aspects of the current boot data 144. Alternatively, the current hash value 172 may be a single hash value, e.g., 172. At the same time or subsequently, in one or more embodiments, the processor 120 retrieves a previous hash value 114 from the private blockchain 165 in operation 420.

The processor 120 then compares the current hash value 172 to a previous hash value 114. In operation 430, the processor 120 determines if the current hash value 172 is the same as the previous hash value 114. If the current hash value 172 is the same as the previous hash value 114, method 400 ends. Otherwise, method 400 proceeds to operation 435.

Once the current hash value 172 is compared with the previous hash value 114 in operation 425 and operation 430 and found to be different, the processor 120 notifies the first external device, e.g., 150A, to use a previous boot procedure, e.g., 168 in operation 435. The processor 120 sends a first notification 145 to the external device, e.g., 150A, which instructs the first external device, e.g., 150A, to use a second boot procedure 168. This second boot procedure 168 may be any previous boot procedure saved as a backup in the memory 152. The second boot procedure 168 should have the same hash value as the previous hash value 114. Alternatively, the memory 110 may store several previous hash values 114, including one that conforms to the boot process 159 and a second hash value 114 that conforms to the second boot process 168.

Once the first external device, e.g., 150A, receives the first notification 145, it performs the second boot process 168 and sends the current boot data 144 based on the second boot process 168 to the processor 120 over the network 140. The processor 120 then performs hashing 122 to produce the updated hash value 174, which is determined by the processor 120 in operation 440. This updated hash value 174 is then compared with the previous hash value 114 stored in the memory 110 in operation 445.

In operation 445, the processor 120 compares the updated hash value 174 with the previous hash value 114. Then, it determines in operation 450 if the updated hash value 174 is the same as the previous hash value 114. If they are determined to be the same in operation 450, the method then ends, and the first external device, e.g., 150A, uses the second boot process 168 as the boot process. The processor 120 may send a second notification 146 to notify the external device, e.g., 150A, to replace the boot process 159 with the second boot process 168.

However, if the processor 120 determines in operation 450 that the updated hash value 174 is different than the previous hash value 114, the processor 120 then sends a second notification 146 to cause the first external device, e.g., 150A, to be quarantined in operation 455 and to alert a third external device, e.g., 150N in operation 460. The second notification 146 may also notify user 160 or the administrator or another concerned party to either carry out the quarantining or perform corrective actions on one or more external devices 150A-150N that may be infected with a boot kit attack. Once either operations 430, 450, or 460 are completed, the method 400 of FIG. 4 ends.

The present examples are to be considered illustrative and not restrictive, and the intention is not to be limited to the details given herein. For example, the various elements or components may be combined or integrated into another system, or certain features may be omitted or not implemented.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system, comprising:
a memory configured to store a previous hash value for a first external device wherein the previous hash value was produced using data associated with a previous boot procedure of the first external device that has been identified as not being corrupted; and
a processor operably coupled to the memory and configured to:
receive, current boot data associated with a current boot procedure of the first external device, wherein the first external device is connected to an external network, and the current boot data includes at least an amount of network data sent and received by the first external device over the external network during the current boot procedure and an amount of time that each step of the current boot procedure takes to be performed;
perform a hash function on the current boot data to produce a current hash value;
compare the current hash value with the previous hash value; and
send to the first external device a first instruction to use a previous boot procedure when the current hash value is different than the previous hash value.

2. The system of claim 1, wherein the processor is further configured to:
receive a new boot procedure from a second external device;
perform the hash function on data associated with the new boot procedure to produce an updated hash value; and
replace the previous hash value with the updated hash value.

3. The system of claim 2, wherein the previous hash value is stored in a blockchain and replacing the previous hash value comprises producing a new block on the blockchain that stores the updated hash value as the previous hash value.

4. The system of claim 1, wherein the processor is further configured to:
receive from the first external device, new boot data associated with the previous boot procedure;
perform a hash function on the new boot data to produce a new hash value;
compare the new hash value with the previous hash value;
send a second instruction to the first external device to perform at least one quarantine action; and
send an alert to a security organization associated with the first external device.

5. The system of claim 4, wherein at least one quarantine action comprises disconnecting the first external device from the external network.

6. The system of claim 1, wherein the current boot data further comprises data associated with a physical characteristic of the first external device when it performs the current boot procedure.

7. The system of claim 1, wherein the current boot data further comprises a total amount of time that the current boot procedure takes to be performed.

8. A method comprising:
receiving, current boot data associated with a current boot procedure of a first external device, wherein the first external device is connected to an external network, and the current boot data includes at least an amount of network data sent and received by the first external device over the external network during the current boot procedure and an amount of time that each step of the current boot procedure takes to be performed;
performing a hash function on the current boot data to produce a current hash value;
comparing the current hash value with a previous hash value that was produced using data associated with a previous boot procedure of the first external device that has been identified as not being corrupted; and
sending to the first external device a first instruction to use a previous boot procedure when the current hash value is different than the previous hash value.

9. The method of claim 8, further comprising:
receiving a new boot procedure from a second external device;
performing the hash function on data associated with the new boot procedure to produce an updated hash value; and
replacing the previous hash value with the updated hash value.

10. The method of claim 9, wherein the previous hash value is stored in a blockchain and replacing the previous hash value comprises of producing a new block on the blockchain that stores the updated hash value as the previous hash value.

11. The method of claim 8, further comprising:
receiving from the first external device new boot data associated with the previous boot procedure;
performing a hash function on the new boot data to produce a new hash value;
comparing the new hash value with the previous hash value;
sending a second instruction to the first external device to perform at least one quarantine action; and
sending an alert to a security organization associated with the first external device.

12. The method of claim 11, wherein at least one quarantine action comprises disconnecting the first external device from the external network.

13. The method of claim 8, wherein the current boot data further comprises data associated with a physical characteristic of the first external device when it performs the current boot procedure.

14. The method of claim 8, wherein the current boot data further comprises a total amount of time that the current boot procedure takes to be performed.

15. A non-transitory computer-readable medium storing instructions that, when executed by a processor, cause the processor to:

receive, current boot data associated with a current boot procedure of a first external device, wherein the first external device is connected to an external network, and the current boot data includes at least an amount of network data sent and received by the first external device over the external network during the current boot procedure and an amount of time that each step of the current boot procedure takes to be performed;

perform a hash function on the current boot data to produce a current hash value;

compare the current hash value with a previous hash value that was produced using data associated with a previous boot procedure of the first external device that has been identified as not being corrupted; and send to the first external device a first instruction to use a previous boot procedure when the current hash value is different than the previous hash value.

16. The non-transitory computer-readable medium of claim 15, wherein the instructions further cause the processor to:

receive a new boot procedure from a second external device;

perform the hash function on data associated with the new boot procedure to produce an updated hash value; and replace the previous hash value with the updated hash value.

17. The non-transitory computer-readable medium of claim 16, wherein the previous hash value is stored in a blockchain and replacing the previous hash value comprises of producing a new block on the blockchain that stores the updated hash value as the previous hash value.

18. The non-transitory computer-readable medium of claim 15, wherein the instructions further cause the processor to:

receive from the first external device, new boot data associated with the previous boot procedure;

perform a hash function on the new boot data to produce a new hash value;

compare the new hash value with the previous hash value;

send a second instruction to the first external device to perform at least one quarantine action; and send an alert to a security organization associated with the first external device.

19. The non-transitory computer-readable medium of claim 18, wherein at least one quarantine action comprises disconnecting the first external device from the external network.

20. The non-transitory computer-readable medium of claim 15, wherein the current boot data further comprises data associated with a physical characteristic of the first external device when it performs the current boot procedure.

\* \* \* \* \*